United States Patent
Yeh et al.

(10) Patent No.: US 9,119,120 B2
(45) Date of Patent: Aug. 25, 2015

(54) NETWORK ASSISTED USER ASSOCIATION AND OFFLOADING TECHNIQUES FOR INTEGRATED MULTI-RAT HETEROGENEOUS NETWORKS

(75) Inventors: Shu-Ping Yeh, Mountain View, CA (US); Ali Yazdan Panah, San Jose, CA (US); Nageen Himayat, Fremont, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/811,300

(22) PCT Filed: May 30, 2012

(86) PCT No.: PCT/US2012/039988
§ 371 (c)(1),
(2), (4) Date: Jan. 21, 2013

(87) PCT Pub. No.: WO2013/112189
PCT Pub. Date: Aug. 1, 2013

(65) Prior Publication Data
US 2014/0287743 A1    Sep. 25, 2014

Related U.S. Application Data

(60) Provisional application No. 61/589,774, filed on Jan. 23, 2012.

(51) Int. Cl.
*H04W 4/00* (2009.01)
*H04W 36/00* (2009.01)
*H04W 28/16* (2009.01)
*H04W 88/10* (2009.01)
*H04B 17/318* (2015.01)
(Continued)

(52) U.S. Cl.
CPC ......... *H04W 36/0066* (2013.01); *H04B 17/318* (2015.01); *H04W 28/16* (2013.01); *H04W 36/0061* (2013.01); *H04W 88/10* (2013.01); *H04B 17/382* (2015.01); *H04W 48/16* (2013.01)

(58) Field of Classification Search
CPC ........................... H04W 36/00; H04W 84/045
USPC ........... 455/426.1, 552.1, 446, 417, 444, 443, 455/522, 436, 515; 370/252, 338, 329
See application file for complete search history.

(56) References Cited

U.S. PATENT DOCUMENTS

| | | | |
|---|---|---|---|
| 2009/0299788 A1* | 12/2009 | Huber et al. | 705/7 |
| 2010/0130210 A1 | 5/2010 | Tokgoz et al. | |
| 2011/0047029 A1* | 2/2011 | Nair et al. | 705/14.52 |

(Continued)

OTHER PUBLICATIONS

"International Application Serial No. PCT/US2012/039988, International Search Report mailed Jan. 2, 2013", 3 pgs.

(Continued)

*Primary Examiner* — Kiet Doan
(74) *Attorney, Agent, or Firm* — Schwegman Lundberg & Woessner, P.A.

(57) ABSTRACT

Methods and systems are described that incorporate joint network assisted offloading and cross-RAT (Radio Access Technology) user mapping techniques for integrated multi-RAT Het-Nets. Techniques are described for network based offloading and user association methods for multi-tier, multi-RAT HetNets, which account for overall user as well as network utility.

14 Claims, 4 Drawing Sheets

(51) Int. Cl.
   *H04W 48/16* (2009.01)
   *H04B 17/382* (2015.01)

(56) References Cited

U.S. PATENT DOCUMENTS

2011/0194527 A1  8/2011  Lin et al.
2011/0244861 A1* 10/2011 Gurusamy et al. ............ 455/436
2011/0261695 A1  10/2011 Zhao et al.
2013/0005326 A1*  1/2013 Flanagan .................... 455/422.1

OTHER PUBLICATIONS

"International Application Serial No. PCT/US2012/039988, Written Opinion mailed Jan. 2, 2013", 5 pgs.

* cited by examiner

Fig. 4

NETWORK ASSISTED USER ASSOCIATION AND OFFLOADING TECHNIQUES FOR INTEGRATED MULTI-RAT HETEROGENEOUS NETWORKS

PRIORITY CLAIM

This application is a U.S. National Stage Filing under 35 U.S.C. 371 from International Application No. PCT/US2012/039988, filed on May 30, 2012, which claims priority to U.S. Provisional Patent Application Ser. No. 61/589,774, filed on Jan. 23, 2012, all of which are incorporated herein by reference in their entireties.

BACKGROUND ART

Multi-tier, multi-RAT (Radio Access Technology) heterogeneous networks (Het-Nets) are a new direction in network architectures for cost-effectively adding cellular capacity and coverage. This architecture comprises a tier of small cells (e.g., picocells, femtocells or relay stations) overlaid on the macro cellular network to augment network capacity. The bulk of the macro network traffic is offloaded to small cells whereas a wide area coverage and mobility is maintained through the macro network. Deployments typically aim for full spectral reuse across the tiers and the cells in the network as licensed spectrum is expensive and scarce. Recent Het-Net architectures also support WiFi-based small cells, exploiting un-licensed spectrum to augment cellular capacity. Multi-RAT (Radio Access Technology) cells integrating both WiFi and Cellular air interfaces in a single infrastructure device are also an emerging trend. When used with multi-RAT client devices, the integrated multi-RAT infrastructure also provides an additional "virtual WiFi" carrier, which can be judiciously exploited to improve capacity and QoS (Quality of Service) performance of multi-tier Het-Net deployments.

In cellular systems, association is typically performed on a per-user basis. Here, each user determines the downlink carrier signal strength and the signal-to-noise-ratio (SNR) corresponding to the base-station, and associates with the base-station with the highest SNR value. While simple to implement, received SNR based methods are not good indicators of the actual throughput a user would experience, since the throughput also depends on the number and mix of users present on each cell in the network. Network coordinated user association and mapping methods can therefore provide better overall performance in terms of actual user "utility" (e.g., user throughput, power efficiency or QoS). One method for performing network assisted association, which has been explored for cellular networks, is based on maximizing "proportional fair" (PF) throughput across users. The PF utility not only depends on the average user throughput (as a function of SNR) but also the load, i.e. number of users, on each base-station. Unlike conventional association, utility-based association cannot be completed on a per-user basis since the user associations are now inter-dependent; changing the association of any one user alters the load (hence the utility) on the serving as well as target base-stations (the old base-station it leaves and new base-station it associates with). As a result, the global utility based association problem is difficult to solve, and sub-optimal heuristic approaches have been proposed as approximate solutions.

Conventional methods of user association may also be used in multi-tier Het-Net deployments where the user can choose a macro base-station (MBS) or a pico base station (PBS) based on received SNR. In this case, user "offload" to pico base stations occurs with no special preference for the PBS. Conventional association methods have a number of limitations in this case as well. Firstly, they fixate the pico coverage range and are therefore dependent on network topology/geometry. For example, in clustered user distributions, users will associate with pico base stations in groups-at-a-time (in a hotspot-fashion) owing to their similar SNR distributions. Secondly, macro base stations are naturally designed for large coverage areas via high transmit power. Conventional offloading may thus lead to over-association with the MBS and under-utilization of the PBSs, particularly in sparse user distributions.

The coverage range of the pico base stations in conventional association can be changed from fixed to dynamic by including an artificial bias value to the SNR reported by the users. Positive bias values effectively assign higher transmit power to the pico base stations hence effectively increasing their coverage. Users are therefore encouraged to associate with pico base station, thus offloading the macro base station. While adding to system-design flexibility, (positive) bias leads to unfavorable interference conditions for the range-extended users (i.e. pico cell-edge users) as they are forced to connect to the weaker (pico) base station even though the signal from the macro user is stronger. The macro base station thus acts as a very strong interferer and effective interference mitigation schemes are required to mitigate the interference from the macro. The 3GPP standard supports Inter-Cell Interference Coordination (ICIC) schemes to manage cross-tier interference in multi-tier HetNet deployments. A typical ICIC approach for managing interference is to "orthogonal-ize" macro and pico transmissions in the zone of strong interference by creating an interference free zone such as a macro free zone (MFZ), or by blanking macro transmissions on some designated sub-frames ("Almost Blank Sub Frames"-ABS). While this approach improves the overall throughput distribution for most users, it sacrifices precious macro capacity that may also hurt the overall aggregate system throughput.

DESCRIPTION OF THE EMBODIMENTS

The methods and systems described herein incorporate joint network assisted offloading and cross-RAT user mapping techniques for integrated multi-RAT Het-Nets. Techniques are described for network based offloading and user association methods for multi-tier, multi-RAT HetNets, which account for overall user as well as network utility. These techniques go beyond received SNR based methods that only track the expected rate of the user and not the actual throughput that also depends on the load on the base-station. Utility may be characterized by several metrics such as throughput, power efficiency, and "timely throughput" (delay).

The described methods and systems may also utilize cross-RAT user partitioning techniques to manage interference with integrated multi-RAT Het-Nets. The specific case of integrated WiFi-LTE (Long Term Evolution) small cells is considered, but the disclosed techniques are applicable to other radio access technologies as well. The cross-RAT partitioning methods exploit the un-licensed bands (available with WiFi air interface in integrated small-cells) to manage interference when macro users are offloaded to small-cells. In case of "open access" small cells this preserves precious macro throughput by precluding the need for a macro-free-zone. Preserving macro throughput is an important consideration in LTE cellular networks as eNBs (evolved node-Bs) are expensive to deploy and must operate with maximum efficiency. These techniques result in a significant gain in cell-edge user throughput, while preserving the aggregate sector throughput performance.

The network based approach towards offloading macro users disclosed herein explicitly accounts for the load on the small cell network, especially with non-uniform heterogeneous user distributions. This aspect is not addressed by offloading based on a fixed bias as implemented by current solutions. The combination of optimized offloading and cross-RAT user partitioning techniques can optimize both the user as well as the overall network utility when compared to existing solutions. The methods discussed herein can also improve performance of single-RAT HetNet deployments as a special case. They are also applicable to other integrated multi-RAT HetNet deployments, such as integrated multi-RAT femto-cellular deployments.

Figure 1:
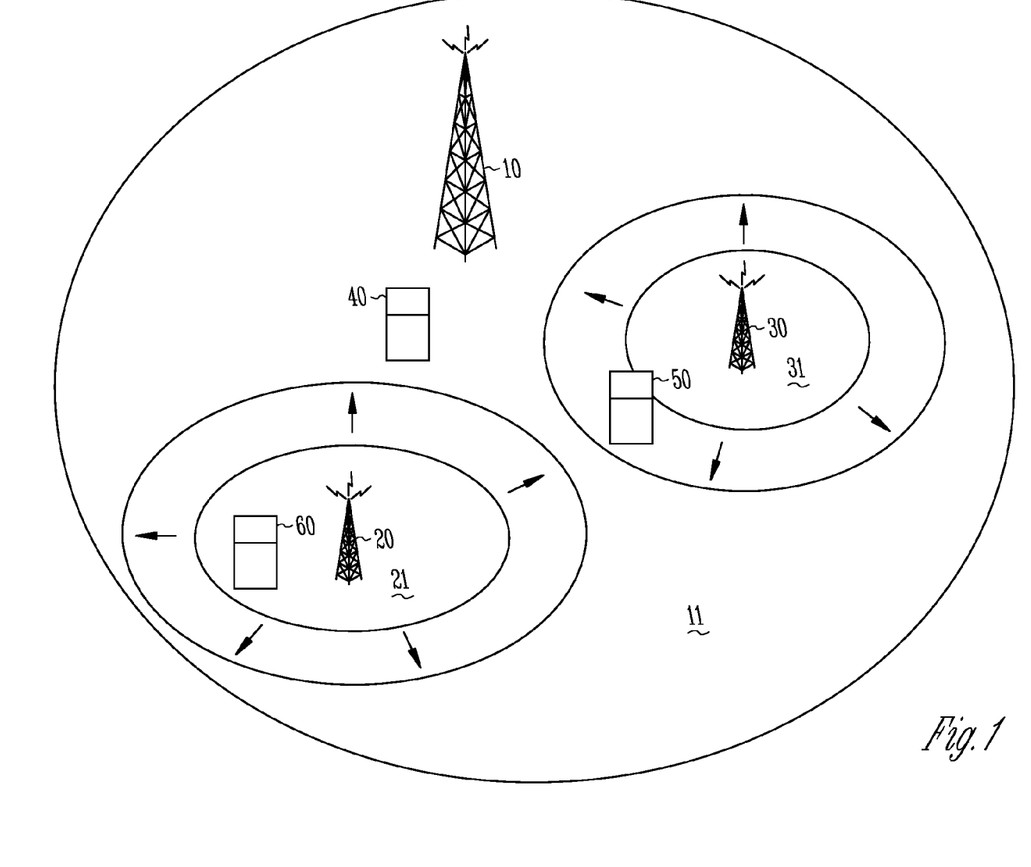
FIG. 1 shows an example cellular communications system.

FIG. 1 shows an example of a Het-Net that includes a macro base station 10 with a coverage zone 11, a pico base station 20 with a coverage zone 21, a pico base station 30 with a coverage zone 31, and mobile devices 40 and 50 that may associate with either the macro base station or one of pico base stations when they are in the appropriate coverage zone. As shown in the figure, the coverage zones of the pico base stations can be effectively extended by including an artificial positive bias value to the SNR reported by the users. By encouraging users to associate with a pico base station due to the extended coverage zone, traffic is offloaded from the macro base station but at the expense of introducing interference from the macro base station to pico cell users at the edge of the extended coverage zones. Such a pico cell edge user is shown as mobile device 50 in FIG. 1.

The techniques described herein account for actual user and network utility in making offloading decisions and can perform better when compared to the fixed association bias methods typically used for HetNet deployments. A utility metric based on proportional fair throughput is used, although the association method may be applied with other metrics such as power efficiency or QoS. WiFi spectrum may also be exploited, available with integrated multi-RAT small cells, to manage the cross-tier interference in Het-Net deployments. User association techniques are employed optimally partition users between the WiFi and the LTE interfaces on the integrated small cell. Heavily interfered cellular users are mapped to WiFi, while the overall load on WiFi is managed by supporting cellular users with good cellular reception on the cellular air interface as much as possible.

Figure 2:
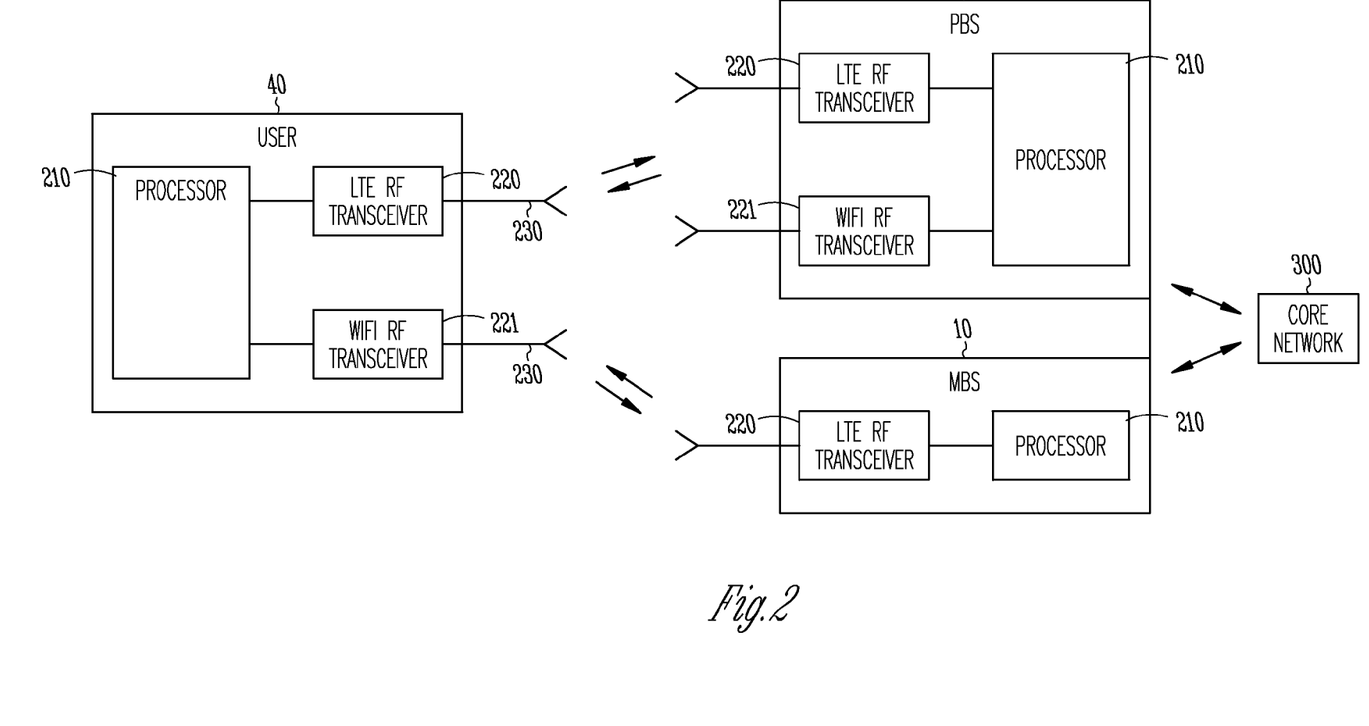
FIG. 2 shows the basic hardware components of a mobile or user device, pico base station, and macro base station.

The methods for offloading users from macro base stations to pico base stations and cross-RAT partitioning as described herein may be implemented by appropriate programming and/or hardware configuration of the MBS, PBSs, and mobile devices (i.e, users). Unless indicated to the contrary by context, the terms "picocell" and "pico base station" as used herein should be taken to refer to a conventional picocell, a femtocell, microcell or any other type of small cell, and the terms "macrocell" and "macro base station" should be taken to refer to any type of macro cell. The mobile devices referred to herein as users should be understood to refer to any type of mobile device or station that can become associated with the base station of a cell. For example, the MBS and the PBSs may be eNBs (eNode-Bs) in accordance with the Long Term Evolution (LTE) specification and provide an LTE air interface for associated users designated as user equipment or UEs. The PBSs may additionally provide a WiFi air interface or other type of air interface for associated users in addition to air interface used to communicate with the macro base station. FIG. 2 shows the basic components of a user mobile device 40, a PBS 20, and an MBS 10 that each have a processor 210 and an LTE RF transceiver 220. The PBS and mobile device are additionally equipped with a WiFi RF transceiver 221. The MBS 10 and PBS 20 also have a communications link to a core network 300 by which associated users are connected to the core network.

Mathematical Formulation of the Association Problem

For simplicity, a system with a single macro base station (MBS) and P pico base-stations (PBS) is considered. The cells provide downlink service to $K^{sys}$ mobile users, constituting the set $S^{sys}$. At any given time, each user is either associated with the MBS or a PBS, i.e. users are divided into two groups: a) macro users: constituting the set $S^{macro}$ with the number of users associated with the macro $K^{macro}=|S^{macro}|$ (the cardinality of the set $S^{macro}$) and b) pico users: constituting the set $S^{pico}$ with $K^{pico}=|S^{pico}|$. The division is such that $S^{sys}=S^{macro} \cup S^{pico}$ with $K^{sys}=K^{macro}+K^{pico}$. The pico user-set is further divided between P pico base stations such that $S^{pico}=\cup_{p=1}^{P} S_p^{pico}$ and $K^{pico}=\Sigma_{p=1}^{P} K_p^{pico}$. Note that the sets are all mutually exclusive.

For the case of integrated Multi-RAT pico base stations (e.g. integrated WiFi & LTE pico base stations), the users associated with the PBS may be further partitioned between WiFi and LTE. Hence for pico base station p, the associated users are further sub-divided into $S_p^{pico}=S_{p,LTE}^{pico} \cup S_{p,Wi-Fi}^{pico}$ and $K_p^{pico}=K_{p,LTE}^{pico}+K_{p,Wi-Fi}^{pico}$.

Assume that the service delivered by each base station results in a certain "utility," $u_k$ for the kth user. The overall system utility may be defined as a "proportionally fair" product of the per user utilities, or equivalently: $U^{sys}=\Sigma_{k=1}^{K_{sys}} \log u_k$. The utilities per base station may be defined as proportionally fair utilities across the users associated with each base station. Specifically, $$U^{sys} = U^{macro} + \sum_{p=1}^{P} U_p^{pico} = U^{macro} + \sum_{p=1}^{P} U_{p,LTE}^{pico} + U_{p,Wi-Fi}^{pico}$$

$$U^{sys} = \sum_{k \in S^{macro}} \log u_k + \sum_{k \in S_{1,LTE}^{pico}} \log u_k + \sum_{k \in S_{1,WiFi}^{pico}} \log u_k + \ldots + \sum_{k \in S_{P,LTE}^{pico}} \log u_k + \sum_{k \in S_{P,WiFi}^{pico}} \log u_k$$

Further assume that proportional fair scheduling is used at the MBS as well as on both the LTE and the WiFi interfaces of the PBSs. The utility per user can then be represented by the resulting long-term throughput achieved by the proportionally fair scheduler (PFS). This may be approximated as $u_k=R_{ave,k} G(K)/K$. (this approximation is valid for a low SNR regime but more accurate approximations are also available). Here $R_{ave,k}=E$ (B log $(1+SINR_k(t))$) is the expected value of the rate achieved by the user, given its SINR resulting from associating with a particular base station. The PFS throughput also depends on the number of users K being scheduled and G(K), the PFS multi-user diversity gain. The diversity gain G(K), also depends on the number of users as well as the variability of the channel, but may be approximated as $G_k = \Sigma_{k=1}^{K} 1/k$. Note that for WiFi, the approximation for multi-user diversity gain may not hold exactly, and a more accurate model can be substituted. Also, instead of predicting the rate based on SINR or SNR estimates, actual throughput measurements may be used. For clarity, the above equations are rewritten to indicate that the user utility depends on the base station selected for association and the number of users supported by the base station:

$$U^{sys}(K^{sys}) = U^{macro}(K^{macro}) + \sum_{p=1}^{P} U_p^{pico}(K_p^{pico})$$

$$= U^{macro}(K^{macro}) + \sum_{p=1}^{P} U_{p,LTE}^{pico}(K_{p,LTE}^{pico}) +$$

$$U_{p,Wi\text{-}Fi}^{pico}(K_{p,WiFi}^{pico})$$

Optimal association of users with the various cells in the network to maximize the overall system utility is usually computationally prohibitive. For example, an exhaustive search to exclusively assign $K^{sys}$ users across the 2P+1 air interfaces across one macro base station and P picos would require checking for $(2P+1)K^{sys}$ possible user assignments, and selecting the combination maximizing the overall system utility. A polynomial complexity, sub-optimal technique is described that partitions the user association problem across multiple stages by decoupling the various variables involved in the utility metric.

Example Algorithm

Figure 3:
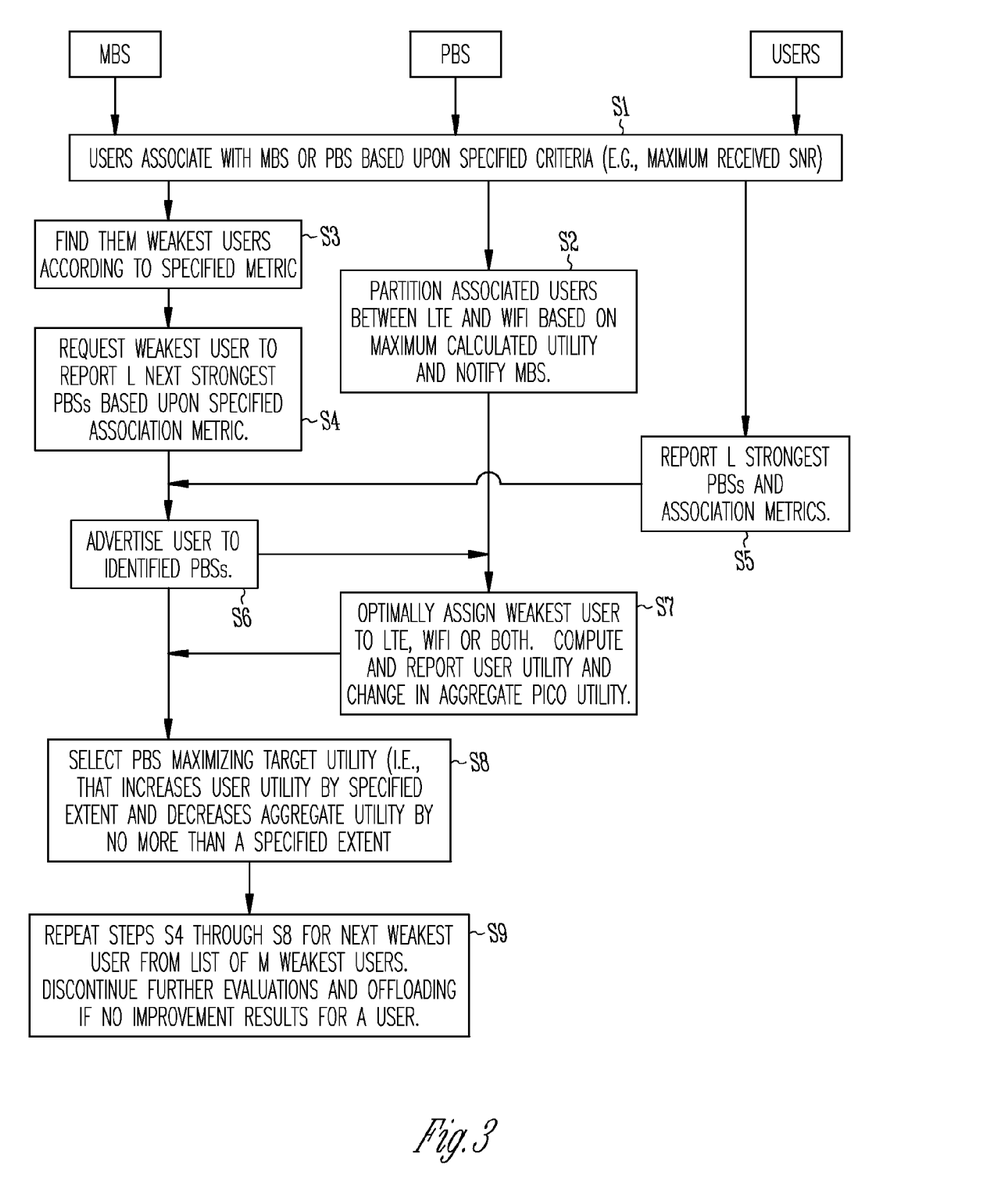
FIG. 3 illustrates an example algorithm for offloading users from a macro base station and cross-RAT partitioning users associated with a pico base station.

A multi-stage sequential approach may be used for user association in integrated multi-RAT Het-Nets, which optimizes a PFS metric across users. Conventional association methods are used for initial association of users across macro and pico base stations. Then a sequential offload procedure is initiated to offload selected users from the macro to the pico base stations. The resulting interference from this forced offload procedure is mitigated by optimizing the partitioning of users between the LTE and WiFi air interfaces in a manner by which the offloaded users experiencing heavy interference from the macro are automatically moved to the WiFi interface. FIG. 3 illustrates the key steps S1 through S8 involved in the sequential offloading procedure according to one embodiment as performed by the MBS, PBS, and users.

Step S1 is the initialization step where users are allowed to make cell selection based on conventional metrics, such as the received SNR. For the PBS, the received SNR from the LTE air interface may be used for association. This creates an initial partitioning of the users across the macro and the pico base stations. Assuming no interference, the SNR also determines the average rate of the user, which contributes to the long term utility of the PFS metric.

At step S2, each small cell maps users to either the WiFi or the LTE air interface. Users may also be simultaneously mapped to both interfaces. The inter-RAT partitioning algorithm can be based on exhaustive search, which becomes feasible as relatively fewer users associated with the pico base station must now be partitioned across just two air interfaces. As described below, an approximate algorithm based on the rank-ordering of relative throughput of users across the two air interfaces may be used, which avoids excessive re-computations each time a new user enters or leaves the system (this cross-RAT partitioning algorithm is described below). The PBS notifies the MBS of the resulting pico utility.

At step S3, users are selected for sequential offload. The macro base station selects M "weakest" users for potential offload to the PBSs. There could be several metrics defining a "weak" user. A weak user could be, for example, a cell-edge user that has weak average SINR (signal-to-interference plus noise ratio) and a weak resulting average throughput. The idea here is that such user may be best serviced by a small cell with fewer users to service, if interference from the macro base station can be effectively managed. At step S4, the macro base station requests each identified weak user to report its L preferred PBSs for offload. At step S5, each weak macro user, user x for example, identifies a rank-ordered list of L strongest PBSs that may best service the user if the macro decides to offload the user. This rank ordering may use the original association metric (such as received power) or another metric. The reporting of the preferred PBS list occurs via "over-the-air" signaling on the macro air interface link. At step S6, the macro cell advertises the weak macro user x to its L preferred PBSs, using the back-haul interface between base-stations and includes the user reported parameters for the PBS air interface link for user x. In case of the LTE cellular system, the backhaul link is the "X2" interface between eNBs.

At step S7, each PBS re-assesses the optimal inter-RAT partitioning of users accounting for the offloaded user. The PBS calculates a differential utility factor equal to the difference of the PFS utility before and after the admission of the candidate user:

$$\delta U_p^{pico}(K_p^{pico}+1) = U_p^{pico}(K_p^{pico}+1) - U_p^{pico}(K_p^{pico})$$

The PBS also computes the new user utility for user x:

$$u_{x,p}(K_p^{pico}+1)$$

which indicates the utility of user x when it associates with PBS p with $K_p$ associated users. The PBS p reports the differential utility and the new user utility to the MBS.

At step S8, the macro base-station receives the new user utility and the differential utility for each of the candidate L cells. It computes two conditions for each PBS p. Given that $$U_{new}^{sys} = U_{initial}^{sys} + \delta U^{macro}(K^{macro}=1) + \delta U_p^{pico}(K_p^{pico}+1),$$

conditions 1 and 2 may be written as $$u_{x,p}(K_p^{pico}+1) > \beta u_{m,macro}(K^{macro}) \text{ for } \beta > 1 \quad \text{(condition 1)}$$

and $$U_{new}^{sys} > \alpha U_{new}^{sys} \text{ for } \alpha > 0 \quad \text{(condition 2)}$$

Condition 1 specifies the minimum improvement in user utility required before the user is offloaded, while condition 2 ensures that the overall system utility does not degrade by more than $(1-\alpha)$ as a result. Amongst all candidate pico cells satisfying conditions 1 and 2, the one achieving the maximum per user utility is picked for offloading user x. If no cells satisfy conditions 1 and 2, the user remains with the MBS and further offloading of users is stopped. Other conditions and modifications may also be used to achieve an alternate tradeoff between user and system performance. The values of $\alpha$ and $\beta$ may be chosen to achieve a suitable tradeoff between system and user performance. Typically, some degradation to aggregate throughput may be allowed to improve performance of weak users in the system. For example, $\alpha=0.95$ may allow for an adequate degradation of the aggregate throughput, and $\beta=1.2$ may reflect the targeted gain in user throughput. However, if the approximation used to calculate $u_k$ holds, then it is sufficient to check for condition 1 and the check for condition 2 is not required. The offloaded user and the selected PBS are notified, and the user is handed off to the PBS. The sets $S^{sys}$ and $S_p^{pico}$ are updated to delete and add user x, respectively. At step S9, the macro cell continues to offload the desired number of weak users to small cells using steps 4-8, unless conditions 1 and 2 are no longer met and the offloading procedure is stopped.

It may be the case that the user association and offloading procedures happen infrequently based on the coherence time channel conditions and when users enter or leave the macrocell or picocell based on "hand-off" conditions being met. The selection of an LTE or WiFi RAT may also happen at a faster rate that may be managed by each picocell on its own. If the long-term average utility of either the small cell or a given user has degraded substantially (e.g., as measured by a suitable threshold), the small cell can trigger an offload request to the macro base-station.

Cross-RAT User Partitioning Procedure at Integrated Multi-RAT Pico Base-Stations Once the initial user association is completed in step S1 of FIG. 3, the complexity associated with partitioning users across multiple RATs at step S2 is much lower. For the WiFi-LTE integrated small-cell, each user has to select from just two different air interfaces (assuming partial association across both WiFi and LTE is ignored). Since fewer users are associated with a pico cell, an optimal partitioning based on exhaustive search becomes feasible. For example, if 10 users are associated with an integrated pico, an exhaustive search would require a search over $2^{10}$ (1024) combinations. However, a near-optimal algorithm for partitioning users across WiFi and LTE that avoids exhaustive search will now be described that could be used instead. The algorithm could also be used by any type of base station, whether or not part of a tiered cell structure, in order to optimally partition users between different air interfaces.

As before, the algorithm is based on the assumption that in steady state the proportional fair metric for the $i^{th}$ user associated with the $j^{th}$ pico station is $$u_{i,j}(K) \sim \frac{G(K_j)R_{ave,i,j}}{K_j} \sim \frac{\log(K_j)R_{ave,i,j}}{K_j}$$

(the subscript "pico" is dropped for convenience). For a fixed partitioning of the users $K_j$, such that m users are associated with WiFi and the remaining ($K_j-m$) users are associated with LTE, a user i will associate with LTE if $$u_{i,j}^{LTE} > u_{i,j}^{WiFi} \rightarrow \frac{\log(K_j-m)R_{ave,i,j}^{LTE}}{K_j-m} > \frac{\log(m)R_{ave,i,j}^{WiFi}}{m} \rightarrow$$

$$\frac{R_{ave,i,j}^{LTE}}{R_{ave,i,j}^{WiFi}} > \frac{\log(m)(K_j-m)}{\log(K_j-m)(m)} = C(m, K_j)$$

The parameter $C(m,K_j)$ only depends on the partitioning of users between WiFi and LTE and is a decreasing function of m. Hence, the mapping algorithm is based on rank ordering the rate ratios in ascending order as follows (the subscripts of "aye" and "j" are ignored):

$$\frac{R_1^{LTE}}{R_1^{WiFi}} < \frac{R_2^{LTE}}{R_2^{WiFi}} < \ldots < \frac{R_m^{LTE}}{R_m^{WiFi}} < C(m, K_j) < \frac{R_{m+1}^{LTE}}{R_{m+1}^{WiFi}} < \ldots < \frac{R_{K_j}^{LTE}}{R_{K_j}^{WiFi}}$$

Figure 4:
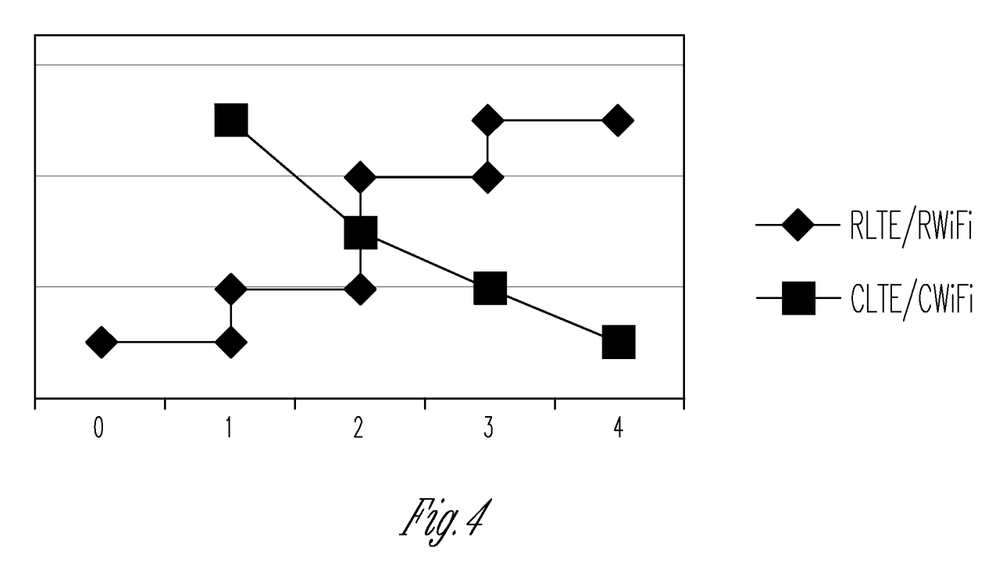
FIG. 4 shows the rate and proportionally fair metric ratios plotted as functions of the number of users assigned to WiFi.

The index m is chosen such that:

$$C(m, K_j) < \frac{R_{m+1}^{LTE}}{R_{m+1}^{WiFi}}$$

as shown, for example, at the intersection point of the shown in FIG. 4. FIG. 4 shows the rate and proportionally fair metric ratios ($R^{LTE}/R^{WiFi}$ and $C^{LTE}/C^{WiFi}$, respectively) plotted as functions of the index m, the number of users assigned to WiFi. A binary search algorithm may also be initiated to further lower the complexity of finding the optimal partitioning point, but the overall complexity of this algorithm is dominated by the complexity of the sorting procedure, which is $O \sim K_j \log(K_j)$.

In the above, the rate of the LTE user can be estimated via the Shannon's formula based on average SINR of the user. The WiFi rate can be approximated based on average SNR, but in practice the actual throughput may be estimated based on measured throughput, which may be better able to capture the effect of contention in the WiFi system. The measurements may be made available by scheduling periodic measurements or by inference from system throughput.

The partitioning algorithm as described above naturally exploits WiFi to map the weak LTE users to WiFi. It thereby avoids the need for creating "macro free zone" (MFZ), saving precious spectral resources for macro use.

Other Embodiments

As described above, the proportional fair utility metric is used to optimize the sequential offload and the cross-RAT partitioning procedures. Alternative utility metrics such as QoS, power efficiency, and other aggregate metrics such as sum user throughput can also be used within the multi-stage sequential framework.

The above descriptions have also focused on out-door integrated Multi-RAT Het-Net deployments with "open-access" pico cells. The methods covered can also be extended to "closed access" integrated deployments, which require a different ICIC solution. In "closed access" deployments, users in the vicinity of a small cell such as an indoor femtocell may prefer to associate with the femtocell but are forced to associate with the MBS as they are denied access by the femtocell. Here, the femtocell can cause severe interference to this macro-associated user. ICIC techniques are now based on creating a "Femto-Free zone" (FFZ). It may be observed that, if integrated WiFi-LTE small-cells are deployed, then instead of creating an FFZ on the cellular band, the power on the cellular band can be lowered, resulting in overall lower throughput for cellular users at the cell-edge. However, with the techniques described herein these users can now be mapped to WiFi. That is, weak cellular users can now be serviced by WiFi using the optimized partitioning between WiFi and LTE, precluding the need for the FFZ in "closed access" Multi-RAT HetNets.

The multi-stage sequential framework as described above can also be applied towards offloading and interference mitigation in single-RAT HetNets. The use of optimized network-based offload and user association can help the macro tailor its offloading procedure to better account for the load on small cells, as well as address non-homogenous user distributions. This is not possible with the fixed bias value that offloads users without consideration of the load on the small cells. For managing cross-tier interference resulting from such offload, some spectrum may be orthogonalized between the tiers and the partitioning of users across the overlapping and non-overlapping bands may be carried out by cross-RAT partitioning methods as described above. In particular, a secondary carrier with cellular RAT can be used instead of WiFi, or a MFZ zone may be created. The MFZ zone may be sized according to the number of users offloaded from the macro to the pico-tier.

In the embodiments described above, the total number of users, $K^{sys}$, refers to the users associated with a given macro cell, and the optimization is carried out by each macro-cell, independent of the other macro-cells in the system. The macro station acts as the central server coordinating the overall offload procedure. However, the sequential frame-work can easily be extended for optimization of global utility across all cells if a central "Self Organizing Network" (SON) server is available for coordination.

The above descriptions have mainly related to HetNets with integrated WiFi-LTE small cells. However, the principals of the described subject matter are equally applicable to other choices of air interfaces, such as WiMAX, BT, 60 GHz, and mm-wave, and other cell types.

In an example embodiment, a macro base station (MBS) operating as an enhanced/evolved Node B (eNB) in an LTE network, comprises: an air interface for communicating with users within a macrocell and connecting associated users to a core network; and processing circuitry configured to identify a number M of the weakest users associated with the MBS according to a defined strength metric, request a list of L preferred pico base stations (PBSs) for offloading from each of the weakest users (where the list of L PBS may be rank ordered), offload a weakest user to one of its L preferred PBSs if information received from that PBS indicates that the offloading would result in changes in a system utility and a user utility as defined by a specified utility metric that meet one or more specified criteria. The processing circuitry may configured to allow users to initially associate with either the MBS or one of the PBSs as a function of the signal to interference and noise ratio (SINR) as measured by the users. The processing circuitry may be configured such that the strength metric for identifying the weakest users is a function of the signal to interference and noise ratio (SINR) as reported by a particular user. The processing circuitry may be configured to advertise a particular weakest user associated with the MBS to one of the user's L preferred PBSs (where the advertising may be performed according to the rank ordering of the list of L PBSs) and receive from that PBS calculated pico system and user utilities (which may be expressed as differential utilities) that would result from that particular weakest user being offloaded to that PBS. The processing circuitry may be configured to offload a weakest user to a particular one of its L preferred PBSs if the following conditions are met: the offloading would result in an increase in the user utility of that weakest user by a specified minimum amount and the offloading would result in a degradation in the overall system utility by no more than a specified maximum amount. The processing circuitry may be configured to calculate the overall system utility as the product of the pico system utilities. The processing circuitry may be configured to evaluate the M identified weakest users for possible offloading in a rank order according to the strength metric and to discontinue evaluation of the weakest users if a particular user fails to meet the criteria for offloading.

In an example embodiment, a base station operating as an enhanced/evolved Node B (eNB) in an LTE network, comprises: an LTE air interface for communicating with users within a cell served by the base station and connecting associated users to a core network; a second air interface for communicating with users within the cell served by the base station and connecting associated users to a core network; and, processing circuitry configured to calculate utilities for users being associated with the base station via either the LTE or second air interface based upon a selected utility metric and optimally partition users between the first and second air interfaces based on the calculated utilities. The second air interface may be a WiFi air interface. The processing circuitry may configured to partition the users so as to maximize the selected utility metric by performing an exhaustive search across the number of partitions possible for the number of users associated with the base station. The processing circuitry may be configured to calculate the user utilities $u^{LTE}$ and $u^{Wi-Fi}$ for a user being associated with the base station via the LTE or Wi-Fi air interfaces, respectively, as:

$$u^{LTE} = G(K)R^{LTE}/K$$

$$u^{Wi-Fi} = G(K)R^{Wi-Fi}/K$$

where K is the number of users associated with the particular base station, G(K) is a function representing the multi-user diversity gain, and where $R^{LTE}$ and $R^{Wi-Fi}$ are measured or expected values of the data rates of the LTE and Wi-Fi air interfaces, respectively, given as:

$$R^{LTE} = B_{LTE} \log(1 + SINR_{LTE})$$

$$R^{Wi-Fi} = B_{Wi-Fi} \log(1 + SINR_{Wi-Fi})$$

where $B_{LTE}$ and $B_{Wi-Fi}$ are bandwidths and where $SINR_{LTE}$ $SINR_{Wi-Fi}$ are measured signal to interference and noise ratios of the LTE and Wi-Fi channels, respectively; and, the may be configured to partition users between the LTE and Wi-Fi air interfaces in a manner that maximizes the calculated user utilities of the associated users. The processing circuitry may configured to partition the users so as to maximize the selected utility metric by performing an exhaustive search across the number of partitions possible for the number of users associated with the base station. Alternatively, the processing circuitry may be configured to optimally partition its K associated users into m users associated via the Wi-Fi air interface and K-m users associated via the LTE air interface and to select the m users by:

(a) for each user, calculating $R^{LTE}$ and $R^{Wi-Fi}$ as measured or expected values of the data rates of the LTE and Wi-Fi air interfaces, respectively, and calculating a rate ratio $R^{LTE}_i/R^{Wi-Fi}_i$ for each user i;

(b) rank ordering the K users according to their rate ratios in ascending order designated as users 1 through K where the first m users are assigned to the Wi-Fi air interface:

$$R^{LTE}_1/R^{Wi-Fi}_1 < \ldots < R^{LTE}_m/R^{Wi-Fi-hd\ m} < \ldots < R^{LTE}_{m+1}/R^{Wi-Fi}_{m+1} < \ldots < R^{LTE}_K/R^{Wi-Fi}_K$$

(c) selecting the number m such that:

$$(\log(m))(K-m)/(\log(K-m))(m) < R^{LTE}_{m+1}/R^{Wi-Fi}_{m+1}$$

The base station may be a pico base station (PBS) for serving a pico cell within a macro cell served by a macro base station (MBS); and, the processing circuitry may be configured to: receive an advertisement from the MBS for an identified particular weakest user associated with the MBS, calculate pico system and user utilities that would result from that particular weakest user being offloaded to the PBS and associated with the PBS via either the LTE or Wi-Fi interface after optimal partitioning of users, and report the calculated utilities (which may be expressed as differential utilities) to the MBS.

In an example embodiment, a method performed by a macro base station (MBS) operating as an enhanced/evolved Node B (eNB) in an LTE network comprises: allowing users to initially associate with either the MBS or a pico base station (PBS) operating within a macrocell served by the MBS as a function of the signal to interference and noise ratio (SINR) measured by the users; identifying a number M of the weakest users associated with the MBS according to a defined strength metric; and, offloading a weakest user a PBS if information received from that PBS indicates that the offloading would result in changes in an overall system utility and a user utility as defined by a specified utility metric that meet one or more specified criteria. The method may further comprise requesting and receiving a list of L preferred PBSs for offloading from each of the weakest users. The method may further comprise advertising a particular weakest user associated with the MBS to one of the user's L preferred PBSs and receiving from that PBS calculated pico system and user utilities that would result from that particular weakest user being offloaded to that PBS. The method may further comprise advertising the particular weakest user associated with the MBS to one of the user's L preferred PBSs according to a rank ordering of the list of L preferred PBSs.

The method may further comprise calculating the overall system utility as the product of the pico system utilities. The method may further comprise evaluating the M identified weakest users for possible offloading in a rank order according to the strength metric and discontinuing evaluation of the weakest users if a particular user fails to meet the criteria for offloading.

In an example embodiment, a method performed by a pico base station (PBS) operating as an enhanced/evolved Node B (eNB) in an LTE network comprises: calculating utilities for users being associated with the base station via either an LTE air interface or a WiFi air interface based upon a selected utility metric; and optimally partitioning users between the LTE and WiFi air interfaces based on the calculated utilities. The method may further comprise partitioning the users so as to maximize the selected utility metric by performing an exhaustive search across the number of partitions possible for the number of users associated with the PBS. The method may further comprise: calculating the user utilities $u^{LTE}$ and $u^{Wi-Fi}$ for a user being associated with the base station via the LTE or Wi-Fi air interfaces, respectively, as:

$$u^{LTE}=G(K)R^{LTE}/K$$

$$u^{Wi-Fi}=G(K)R^{Wi-Fi}/K$$

where K is the number of users associated with the particular base station, G(K) is a function representing the multi-user diversity gain, and where $R^{LTE}$ and $R^{Wi-Fi}$ are measured or expected values of the data rates of the LTE and Wi-Fi air interfaces, respectively, given as:

$$R^{LTE}=B_{LTE}\log(1+SINR_{LTE})$$

$$R^{Wi-Fi}=B_{Wi-Fi}\log(1+SINR_{Wi-Fi})$$

where $B_{LTE}$ and $B_{Wi-Fi}$ are bandwidths and where $SINR_{LTE}$ $SINR_{Wi-Fi}$ are measured signal to interference and noise ratios of the LTE and Wi-Fi channels, respectively; and, partitioning users between the LTE and Wi-Fi air interfaces in a manner that maximizes the calculated user utilities of the associated users.

The method may further comprise: optimally partitioning its K associated users into m users associated via the Wi-Fi air interface and K-m users associated via the LTE air interface; selecting the m users by: (a) for each user, calculating $R^{LTE}$ and $R^{Wi-Fi}$ as measured or expected values of the data rates of the LTE and Wi-Fi air interfaces, respectively, and calculating a rate ratio $R^{LTE}_i/R^{Wi-Fi}_i$ for each user i; rank ordering the K users according to their rate ratios in ascending order designated as users 1 through K where the first m users are assigned to the Wi-Fi air interface:

$$R^{LTE}_1/R^{Wi-Fi}_1 < \ldots < R^{LTE}_m/R^{Wi-Fi}_m < \ldots < R^{LTE}_{m+1}/R^{Wi-Fi}_{m+1} < \ldots < R^{LTE}_K/R^{Wi-Fi}_K$$

and, selecting the number m such that:

$$(\log(m))(K-m)/(\log(K-m))(m) < R^{LTE}_{m+1}/R^{Wi-Fi}_{m+1}$$

The method may further comprise: receiving an advertisement from the MBS for an identified particular weakest user associated with the MBS; calculating pico system and user utilities that would result from that particular weakest user being offloaded to the PBS and associated with the PBS via either the LTE or Wi-Fi interface after optimal partitioning of users; and, reporting the calculated utilities to the MBS.

In an example embodiment, a method for operating a cellular communications system that includes a plurality of cells, comprises: initially associating users with particular cells in accordance with a defined user association rule; identifying a number M of the weakest users associated with a particular cell according to a defined strength metric; requesting a list of L preferred cells for offloading from each of the weakest users; and offloading a weakest user to one of its L preferred cells if information received from that preferred cell indicates that the offloading would result in changes in a system utility and a user utility as defined by a specified utility metric that meet one or more specified criteria. The plurality of cells may comprise a tier of small cells overlaid on a larger macro cell. The macro cell and small cells may each provide a first type of air interface for associated users, the small cells additionally provide a second type of air interface. For example, the first type of air interface may be an LTE interface and the second type of air interface may be a WiFi interface. The method may further comprise optimally partitioning users associated with small cells between the first and second types of air interfaces based on a selected utility metric. The partitioning may be performed by either an exhaustive search to maximize the selected utility metric by using the near-optimal algorithm for cross-RAT partitioning as described above.

In another example embodiment, a cellular communications system is made up of a macro base station (MBS) serving a macrocell overlaid with a plurality of picocells served by pico base stations (PBSs), each type of base station being configured to connect users (i.e., mobile devices) to a core network via an air interface. The MBS and PBSs of the system may be according to any of the embodiments described above.

The embodiments as described above may be implemented in various hardware configurations that may include a processor for executing instructions that perform the techniques described. Such instructions may be contained in a suitable storage medium from which they are transferred to a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNode-B.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A macro base station (MBS) to operate as an enhanced/evolved Node B (eNB) in an LTE network, comprising:
   an air interface to communicate with users within a macrocell and connect associated users to a core network;
   an interface to communicate with a plurality of pico base stations (PBSs) via a backhaul link;
   processing circuitry configured to:
   identify a number M of the weakest users associated with the MBS according to a defined strength metric where M is a specified integer;
   request a list of preferred PBSs for offloading from a candidate user selected from the M weakest users where L is a specified integer;
   receive a differential pico system utility from a candidate PBS selected from the candidate user's preferred PBSs which reflects the difference in overall throughput for the candidate PBS if the candidate user were to be offloaded to the candidate PBS;
   receive a user utility from the candidate PBS which reflects the throughput for the candidate user if the candidate user were to be offloaded to the candidate PBS; and,
   offload the candidate user from the MBS to the candidate PBS if such offloading would meet criteria that include an increase in the user utility by a specified extent and a decrease in the pico system utility for the candidate PBS by no more than a specified extent.

2. The MBS of claim 1 wherein the processing circuitry is configured to allow users to initially associate with either the MBS or one of the PBSs as a function of the signal to interference and noise ratio (SINR) as measured by the users.

3. The MBS of claim 1 wherein the processing circuitry is configured such that the strength metric for identifying the weakest users is a function of the signal to interference and noise ratio (SINR) as reported by a particular user.

4. The MBS of claim 1 wherein the processing circuitry is configured to advertise the candidate user associated with the MBS to the candidate PBS and receive from the candidate PBS calculated pico system and user utilities that would result from the candidate user being offloaded to the candidate PBS.

5. The MBS of claim 4 wherein the processing circuitry is configured to select the candidate PBS from among the user's L preferred PBSs according to a rank ordering of the list of L preferred PBSs.

6. The MBS of claim 1 wherein the processing circuitry is configured to evaluate candidate users from among the M weakest users for offloading in a rank order according the strength metrics for the M weakest users.

7. The MBS of claim 1 wherein the processing circuitry is configured to calculate an overall system utility as the product of a plurality of pico system utilities.

8. The MBS of claim 1 wherein the processing circuitry is configured to evaluate the M identified weakest users for possible offloading in a rank order according to the strength metric and to discontinue evaluation of the weakest users if a particular user fails to meet the criteria for offloading.

9. A method performed by a macro base station (MBS) operating as an enhanced/evolved Node B (eNB) in an LTE network, comprising:
   allowing users to initially associate with either the MBS or a pico base station (PBS) operating within a macrocell served by the MBS as a function of the signal to interference and noise ratio (SINR) measured by the users;
   identifying a number M of the weakest users associated with the MBS according to a defined strength metric;
   requesting a list of L preferred PBSs for offloading from a candidate user selected from the M weakest users where L is a specified integer;
   receiving a differential pico system utility from a candidate PBS selected from the candidate user's preferred PBSs which reflects the difference in overall throughput for the candidate PBS if the candidate user were to be offloaded to the candidate PBS;
   receiving a user utility from the candidate PBS which reflects the throughput for the candidate user if the candidate user were to be offloaded to the candidate PBS; and,
   offloading the candidate user from the MBS to the candidate PBS if such offloading would meet criteria that include an increase in the user utility by a specified extent and a decrease in the pico system utility for the candidate PBS by no more than a specified extent.

10. The method of claim 9 further comprising advertising the candidate user associated with the MBS to the candidate PBS and receiving from the candidate PBS calculated pico system and user utilities that would result from the candidate user being offloaded to the candidate PBS.

11. The method of claim 10 further comprising selecting the candidate PBS from among the user's L preferred PBSs according to a rank ordering of the list of L preferred PBSs.

12. The method of claim 11 further comprising evaluating candidate users from among the M weakest users for offloading in a rank order according the strength metrics for the M weakest users.

13. The method of claim 11 further comprising calculating an overall system utility as the product of the pico system utilities.

14. The method of claim 9 further comprising evaluating the M identified weakest users for possible offloading in a rank order according to the strength metric and discontinuing evaluation of the weakest users if a particular user fails to meet the criteria for offloading.

* * * * *